United States Patent [19]

Karácsonyi née Éva Spindler et al.08Patent:

[11] Patent Number: 4,544,410

Oct. 1, 1985

[54] PROCESS FOR THE PRODUCTION OF AN AQUEOUS BITUMINOUS PREPARATION

[76] Inventors: Béláné Karácsonyi née Éva Spindler, 1089, Benyovszky M.u.19; Béla Rácz, 1121, Cinege ut 8/b; István Böszörményi, 1182, Boja ut 11.; László Király, 1012, Attila ut 79.; András Medgyesi, 1025, Nagybányai ut 78/c, all of Budapest, Hungary

[21] Appl. No.: 549,018

[22] Filed: Nov. 4, 1983

Related U.S. Application Data

[63] Continuation of Ser. No. 403,234, Jul. 29, 1982, abandoned.

[30] Foreign Application Priority Data

Jul. 30, 1981 [HU] Hungary ............................. 2224/81

[51] Int. Cl.⁴ ......................... C08K 5/01; C08L 95/00
[52] U.S. Cl. .................................... 106/278; 106/277; 106/279; 208/44; 252/311.5
[58] Field of Search ...................... 106/278, 277, 279; 208/44; 252/311.5

[56] References Cited

U.S. PATENT DOCUMENTS 3,695,152 10/1972 Graf ..................................... 106/280

*Primary Examiner*—Paul Lieberman
*Assistant Examiner*—Robert A. Wax
*Attorney, Agent, or Firm*—Gabriel P. Katona

[57] ABSTRACT

A stable, thixotropic aqueous bitumen dispersion containing no emulsifier is prepared. Alkaline earth metal hydroxide and an aluminum salt are brought into contact to form an aqueous aluminum hydroxide gel. Molten bitumen is dispersed in the gel. The dispersion has a good shelf life and is stable with respect to electrolytes and chemically active construction materials.

10 Claims, No Drawings

PROCESS FOR THE PRODUCTION OF AN AQUEOUS BITUMINOUS PREPARATION

This is a continuing application of application Ser. No. 403,234, filed on July 29, 1982 now abandoned.

The invention concerns a process for the production of aqueous bituminous preparations and such preparations themselves, employable for numerous purposes in the construction industry.

Bitumen is used in enormous quantities in the high rise and underground construction industries for various purposes. Without claiming to be comprehensive the following may be mentioned as areas of use:

the production of asphalt with filler materials;

the preparation of roof plates or covering slabs with carrier materials;

preparation of bonding and insulating systems;

the preparation of adhesives and varnishes dissolved in a solvent;

the preparation of aqueous bituminous emulsions combined with ionic or non-ionic emulsifiers.

For the most part the bitumen is melted at the site of use and is applied in a molten condition, e.g. for building roads or insulating systems. The melting of the bitumen and the operations carried out with hot bitumen are laborious and involve risks of accidents and fires. The multiple melting and re-melting of the bitumen requires a lot of labour and energy.

The area of utilization of bituminous solutions prepared with white spirit or benzene is limited and they are suitable for priming surfaces to be painted or for the preparation of temporary protective layers. Amongst aqueous bituminous preparations bituminous emulsions are known. In bituminous emulsions the bitumen is suspended in the aqueous medium in the form of finely distributed drops under the effect of suitable additives, emulsifiers and stabilizers. The anionic, cationic or non-ionic characteristics of the emulsifiers determine the conditions of utilization of the bituminous emulsions, their stability, their pH range, their properties of adhesion and their compatibility with other materials used in the construction industry. The stability of bituminous emulsions is assured by emulsifiers and stabilizers but these partly impede the break-up of the emulsion and the formation a continuous bituminous layer. In addition, the emulsions are sensitive to electrolytes, they are compatible with chemically-active constructional materials such as lime, hydraulic cement and gypsum only to a limited extent and their stability is also restricted.

The aim of the present invention is to prepare aqueous bituminous preparations which can be generally used in the cold state and stored in that form, in which preparations the bitumen is fully compatible with the active constructional materials, can be applied manually or mechanically to form a continuous and coherent layer, and by itself or combined with additives may be simply applied without the risk of fires or accidents.

The aqueous bituminous preparation according to the invention is prepared by dispersing by mixing a bitumen melt in an aqueous medium containing aluminium hydroxide which is prepared by means of an alkaline earth metal oxide or hydroxide and/or magnesium oxide or hydroxide, or a water-soluble aluminium salt is mixed with the bitumen melt and in situ, with the aid of an excess of an alkaline earth metal hydroxide, aluminium hydroxide is prepared.

The bitumen content of the aqueous preparation is set to between 35%–65% by weight while its solid matter content is at most 70% by weight. Based on the bitumen, an amount of aluminium hydroxide is used which is capable of maintaining the bitumen melt drops in the form of a stable aqueous dispersion. Based on the bitumen, this quantity of aluminium hydroxide is expediently prepared from e.g. 2 weight percent of aluminium sulphate and 10 weight percent of calcium hydroxide. To prepare the aqueous bitumen dispersion expediently freshly prepared aluminium hydroxide gel is used. The aluminium hydroxide gel is prepared from industrial quality aluminium sulphate of the composition $Al_2(SO_4)_3.18H_2O$, the aluminium content of which is around 17 weight percent. The bitumen is added at a temperature above its softening point to the previously heated aqueous medium in which previously the gel-like aluminium hydroxide was prepared at elevated temperature; the bitumen temperature is typically from 150° to 160° C. prior to its mixing with the aqueous medium. Calculated on the bitumen the amount of alkaline earth metal oxide or hydroxide is set to about 16–20 weight percent. Preferably, the pH value of the composition is adjusted to 7.5. When the alkaline earth metal hydroxide is calcium hydroxide, then the latter is added in the form of slaked lime, lime pulp or lime powder (hydrate of lime). From the magnesium oxide magnesium hydroxide is first prepared. The calcium and magnesium oxide or hydroxide can also be mixed together and used as such. The softening point of the bitumen may be as desired. According to experience a product quality having a softening point between 45°–110° C. is suitable for the production of the preparation but it is also possible to use bitumen modified with a synthetic material, known as compound bitumen, having a higher softening point.

The invention also extends to aqueous bituminous preparations which at ambient temperatures are of mastic-like, pulpy consistency, are storable and water-miscible, and which contain at least 35 weight percent bitumen dispersed with aluminium hydroxide gel, expediently in the presence of an alkaline earth metal hydroxide and/or magnesium hydroxide.

The novel aluminium hydroxide-containing bituminous preparation can be regarded as a mixture of organic and inorganic binding material from which on application or other utilization the water content evaporates and the bitumen forms a continuous and coherent layer while the calcium or magnesium hydroxide binds carbon dioxide from the atmosphere and is transformed into calcium or magnesium carbonate while losing water. The film-like layer prepared from the composition is both bitumen-like and lime-like, whereby it may be used for the most varied purposes in the construction industry.

It could not be expected that freshly prepared amorphous aluminium hydroxide having a large active surface is capable of lastingly adsorbing the bituminous droplets formed from the bituminous melt without losing the gel like properties of the aluminium hydroxide in the aqueous phase and its dispersing activity. The aluminium hydroxide gel having droplets of bitumen on its surface is a stable dispersion and is capable of retaining at ambient temperature the bitumen in a dispersed state. The produced bituminous paste is not sensitive to electrolytes, it is fully compatible with chemically active constructional materials such as lime or cement and gypsum and when applied manually or mechanically on the surface of various constructional material it is capable of forming a continuous self-hardening and coherent layer, which has insulating and bonding properties. When however it is incorporated into constructional materials such as hydraulic cement or concrete it transforms them into water-insulating constructional materials.

The bituminous preparation according to the invention may for instance be used for the preparation of cold asphalt, for bonding-embedding mortar, for soil reinforcing purposes, insulating, as a separate layer or incorporated into a constructional material such as hydraulic cement or concrete and for bonding various porous surfaces as an adhesive material.

The process according to the invention is described in detail in the Examples below:

EXAMPLE 1

In 10 parts by weight water 3 parts by weight of $Al_2(SO_4)_3.18H_2O$ and 10 parts by weight calcium hydroxide powder mixed in 30 parts by weight water are dissolved. On combining the previously prepared solutions a gel having the consistency of thin cream is formed under heating. To this is added 47 parts by weight, bitumen of DIN 1995 B 25 quality, heated to a temperature of 150° to 160° C. While mixing the two materials together the aqueous medium is stirred. Its pH value is 11. After stirring for twenty minutes a homogeneous black or dark grey thixotropic aqueous bituminous composition is obtained. The aqueous composition can be diluted with water until reaching a dry matter content of 30 parts by weight without losing its thixotropic properties and ability to bind. In place of calcium hydroxide powder magnesium hydroxide prepared from burnt magnesia may also be utilized.

EXAMPLE 2

From slaked lime, 40 parts by weight of milk of lime having 25% dry matter content is prepared. 1.5 parts by weight of $Al_2(SO_4)_3.18H_2O$ are dissolved in 10 parts by weight water and added, under stirring, to the milk of lime. After the formation of the gel-consistency material and under intensive stirring DIN 1995 B 80 quality molten bitumen are added in an amount of 48.5 parts by weight heated to a temperature of 120° C. The pH value is 11.5–12. A black homogeneous preparation is formed after about 20 minutes.

EXAMPLE 3

40 parts by weight DIN 1995 B 80 quality bitumen is heated to a temperature above 100° C. and to the bitumen melt 1.5 parts by weight $Al_2(SO_4)_3.18H_2O$ are added slowly. When the foaming stops the bitumen is added under intensive stirring to a previously prepared 60 parts by weight milk of lime having a dry matter content of 25% by weight. In the aqueous preparation the degree of dispersion of the bitumen is initially coarse, but after standing and multiple intensive stirring steps, it becomes gradually finer and a thixotropic preparation is obtained.

The thus prepared bituminous preparation may be mixed without limit with the following frequently used binding materials:
hydraulic cement,
lime,
gypsum,
synthetic dispersions, thus polyvinyl acetate, polyacrylate dispersion, or
rubber and synthetic latex.

Until a dry matter content of 30 weight percent of the preparation is reached the preparation remains of mortar-like consistency when diluted with water, it is thixotropic, it may be further diluted with water without limit, after longer standing it settles out slightly but may be stirred and mixed again without residue. At a temperature below 0° C. the preparation solidifies but on melting it reversibly reforms.

EXAMPLE 4

In 10 parts by weight of water 1 part by weight of aluminium sulphate octadecahydrate was dissolved at 40° C. and to this solution 8 parts by weight hydrated lime (25 percent by weight) were added. The thus formed aluminium hydroxide gel had a pH value of 10.5 and was introduced into a colloid mill at 50° C. together with 50 parts by weight bitumen at 120° C. (quality DIN 1995 B 81). Data of colloid mill: output 60 metric tons per hour, r.p.m. 960, slit width 0.3–0.5 mm.

On the basis of experiments of utilization technology, the preparation according to the invention can be used for sticking together the following constructional materials in any desired paired combination:
asbestos slates,
iron plate,
glass,
wood,
bituminous roof plate or slab,
concrete,
plastered concrete surface,
brick,
tile,
soft and hard synthetic foams,
mineral wool sheets,
cork,
clay plates,
glass wool,
synthetic wool.

In a film-like continuous layer prepared from a preparation according to the invention a rise of 10°–15° in the softening point takes place in relation to the softening point of the starting material of bitumen. The water resistance of the layer is excellent. Plastered or lime covering layers can be applied to the freshly prepared film-like layer and both adhere well to it.

With the preparation according to the invention a cold asphalt mixture can be prepared, e.g. of the following composition:
8 parts by weight ground lime
10 parts by weight sand
15 parts by weight crushed basalt of 0–5 mm size
30 parts by weight of crushed basalt of 5–12 mm size
37 parts by weight of crushed basalt of 12–20 mm size
20 parts by weight of preparation according to Example 2.

After compacting the above mixture and drying for 48 hours the mixture hardens and can be loaded. By adding 5–10 parts by weight hydraulic cement and the same amount of water the hardening time is shortened and the rigidity or strength of the asphalt layer is also increased.

By applying the preparation according to Example 2 in one layer, it can be used as a water protection system with a specific material consumption of 3–4 kg/m² on a previously cleaned and de-dusted concrete or brick surface. After setting of the first layer, which requires about 6–8 hours, the second layer is applied at the specific material consumption rate mentioned above. The thus produced insulation is effective at up to 1 atmosphere pressure against soil vapour and moisture and even against ground water. Where it is anticipated that the surface will shift or crack, then it is expedient to place a glass fabric layer of 5 mm mesh between two insulating layers.

We claim:

1. A process for preparing a stable, thixotropic aqueous bitumen dispersion without emulsifier, which comprises contacting an alkaline earth metal hydroxide and an aluminum salt wherein the amount of alkaline earth metal hydroxide is in excess of that which is stoichiometrically required for forming aluminum hydroxide, and dispersing from about 35% to about 65% (wt), based on the dispersion, of molten bitumen in an aqueous aluminum hydroxide dispersion, the aqueous dispersion further containing the aforesaid excess of unreacted alkaline earth metal hydroxide, whereby the resulting dipersion has a good shelf life and is stable with respect to electrolytes and chemically active construction materials.

2. The process of claim 1, further comprising the step of adjusting the pH of the suspension to a value of about 7.5.

3. The process of claim 1, wherein the aluminum salt is aluminum sulfate, and the aqueous dispersion further contains an alkaline earth metal sulfate as a reaction product.

4. The process of claim 3, wherein said alkaline earth metal salt is calcium hydroxide.

5. A process for the production of an aqueous bitumen dispersion without emulsifier, which comprises preparing an aqueous aluminum hydroxide gel by the reaction in water of aluminum sulfate and calcium hydroxide in a weight ratio of 1:3 to 1:10 and while the aluminum hydroxide gel is still relatively fresh, dispersing from about 35% to about 65% (wt) based on the dispersion, of bitumen in said aqueous reaction mixture at a temperature above the softening point of bitumen, whereby a thixotropic dispersion is obtained that is stable with respect to electrolytes and chemically active construction materials.

6. A stable, aqueous, thixotropic bituminous dispersion that is free of emulsifiers, which comprises from about 35% to about 65% (wt) bitumen suspended in water with the aid of an aluminum hydroxide suspending agent, said suspending agent having been prepared relatively soon before the bitumen was suspended, by a reaction between an aluminum salt and an alkaline earth metal hydroxide, with the latter being in excess of that stoichiometrically required for the reaction with the aluminum salt, the dispersion further comprising the aforesaid excess of the alkaline earth metal hydroxide, whereby the resulting dispersion has a good shelf life and is stable with respect to electrolytes and chemically active construction materials.

7. The dispersion of claim 6, wherein the pH of the dispersion is about 7.5.

8. The dispersion of claim 6, wherein the aluminum salt is aluminum sulfate, and said aqueous dispersion further contains and alkaline earth metal sulfate reaction product.

9. The dispersion of claim 8, wherein said alkaline earth metal salt is calcium sulfate.

10. An aqueous bitumen dispersion without emulsifier, which comprises from about 35% to about 65% (wt) bitumen suspended in water with the aid of an aluminum hydroxide gel made in situ by the reaction in water of aluminum sulfate and a stoichiometric excess of calcium hydroxide in a weight ratio of 1:3 to 1:10, the suspension further containing the excess calcium hydroxide and calcium sulfate formed from the said reaction, whereby said dispersion is thixotropic and is stable with respect to electrolytes and chemically active construction materials.

* * * * *